(12) United States Patent
Kumagai et al.

(10) Patent No.: US 10,106,064 B2
(45) Date of Patent: Oct. 23, 2018

(54) SEAT PAD

(71) Applicants: BRIDGESTONE CORPORATION, Tokyo (JP); TACHI-S CO., LTD., Tokyo (JP)

(72) Inventors: Kenji Kumagai, Tokyo (JP); Junpei Yoshikawa, Tokyo (JP); Kei Miyata, Tokyo (JP)

(73) Assignees: BRIDGESTONE CORPORATION, Chuo-ku, Tokyo (JP); TACHI-S CO., LTD., Akishima-shi, Tokyo (JP)

(*) Notice: Subject to any disclaimer, the term of this patent is extended or adjusted under 35 U.S.C. 154(b) by 32 days.

(21) Appl. No.: 15/302,530

(22) PCT Filed: Apr. 6, 2015

(86) PCT No.: PCT/JP2015/060738
§ 371 (c)(1),
(2) Date: Oct. 7, 2016

(87) PCT Pub. No.: WO2015/156248
PCT Pub. Date: Oct. 15, 2015

(65) Prior Publication Data
US 2017/0021750 A1   Jan. 26, 2017

(30) Foreign Application Priority Data
Apr. 8, 2014 (JP) ................ 2014-079139

(51) Int. Cl.
*A47C 7/72* (2006.01)
*B60N 2/56* (2006.01)
(Continued)

(52) U.S. Cl.
CPC ............ *B60N 2/5664* (2013.01); *A47C 7/746* (2013.01); *A47C 27/14* (2013.01); *B60N 2/5621* (2013.01); *B68G 11/04* (2013.01)

(58) Field of Classification Search
CPC .... B60N 2/5664; B60N 2/5621; A47C 7/746; A47C 27/14; B68G 11/04
(Continued)

(56) References Cited

U.S. PATENT DOCUMENTS

| 2,931,427 A | * | 4/1960 | Goldstein | ................ | A47C 7/16 |
| | | | | | 297/452.43 |
| 7,070,232 B2 | * | 7/2006 | Minegishi | ................ | A47C 7/18 |
| | | | | | 297/180.14 |

(Continued)

FOREIGN PATENT DOCUMENTS

| DE | 2409324 A1 | 9/1975 |
| JP | 57-85270 U | 5/1982 |

(Continued)

OTHER PUBLICATIONS

English Machine Translation of JP Publication No. 57-099454U published on Jun. 18, 1982.
(Continued)

*Primary Examiner* — Mark R Wendell
(74) *Attorney, Agent, or Firm* — Sughrue Mion, PLLC (57) ABSTRACT

Providing a seat pad that can provide good sitting comfortability with bonding between a ventilation member and an expanded resin foam included in the seat pad ensured.
A seat pad 10 including a ventilation member 20 having a function that lets air through to/from an outside, the seat pad 10 being formed by integral expansion molding of an expandable resin material M with the ventilation member 20 introduced therein, includes a covering member 30 that covers at least a part of the ventilation member 20 at an interface between the ventilation member 20 and the expandable resin material M, and the covering member 30 includes an impregnation inhibiting material having a func-
(Continued)

tion that inhibits infiltration of the expandable resin material M, the function being at least higher than that of the ventilation member 20.

8 Claims, 6 Drawing Sheets

(51) Int. Cl.
  *A47C 27/14* (2006.01)
  *A47C 7/74* (2006.01)
  *B68G 11/04* (2006.01)
(58) Field of Classification Search
  USPC .................................................. 297/180.1
  See application file for complete search history.

(56) References Cited

U.S. PATENT DOCUMENTS

| 8,777,320 | B2* | 7/2014 | Stoll | B60H 1/00285 |
| | | | | 297/180.1 |
| 2006/0175877 | A1* | 8/2006 | Alionte | A47C 7/74 |
| | | | | 297/180.14 |
| 2007/0241604 | A1* | 10/2007 | Saitou | B60N 2/5621 |
| | | | | 297/452.26 |
| 2009/0079236 | A1* | 3/2009 | Itou | B60N 2/5635 |
| | | | | 297/180.1 |
| 2009/0152908 | A1* | 6/2009 | Lazanja | B60N 2/5635 |
| | | | | 297/180.12 |
| 2011/0109127 | A1* | 5/2011 | Park | B60N 2/5642 |
| | | | | 297/180.1 |
| 2012/0213880 | A1* | 8/2012 | Nii | B29C 44/145 |
| | | | | 425/4 R |
| 2014/0005348 | A1* | 1/2014 | Adachi | D01D 5/04 |
| | | | | 528/68 |
| 2015/0158214 | A1* | 6/2015 | Mogi | B29C 44/1276 |
| | | | | 264/46.4 |
| 2015/0158405 | A1* | 6/2015 | Miyata | A47C 27/14 |
| | | | | 297/180.1 |
| 2015/0274048 | A1* | 10/2015 | Mogi | B60N 2/5642 |
| | | | | 297/452.48 |
| 2015/0314716 | A1* | 11/2015 | Zimmann | B60N 2/5642 |
| | | | | 297/452.38 |
| 2017/0028886 | A1* | 2/2017 | Zhang | B60N 2/565 |
| 2017/0361742 | A1* | 12/2017 | Craig | B60N 2/5657 |

FOREIGN PATENT DOCUMENTS

| JP | 57-99454 U | 6/1982 |
| JP | 1-104247 U | 7/1989 |
| JP | 2006-42985 A | 2/2006 |
| JP | 2010-200906 A | 9/2010 |
| JP | 2013169944 A | 9/2013 |
| WO | 2014080614 A1 | 5/2014 |

OTHER PUBLICATIONS

International Search Report for PCT/JP2015/060738 dated May 26, 2015.

* cited by examiner

SEAT PAD

CROSS REFERENCE TO RELATED APPLICATIONS

This application is a National Stage of International Application No. PCT/JP2015/060738 filed Apr. 8, 2014, claiming priority based on Japanese Patent Application No. 2014-079139 filed Apr. 8, 2014, the contents of all of which are incorporated herein by reference in their entirety.

TECHNICAL FIELD

The present invention relates to a seat pad, and specifically relates to a seat pad including a ventilation member having a function that lets air through to/from the outside, the seat pad being formed by integral expansion molding of an expandable resin material with the ventilation member introduced therein.

BACKGROUND ART

For example, a seat pad to be used for a vehicle seat typically includes a back pad that supports the back of an occupant and a cushion pad that supports the buttock of the occupant, and is molded using an expanded resin foam such as a flexible polyurethane foam or a semirigid polyurethane foam produced by expansion of an expandable resin material.

Regarding such seat pad, a technique in which grooves are formed in a seat surface of the cushion pad and a front surface of the back pad and a thin foam layer is stacked on the grooves and tunnel-like ventilation portions are thereby formed by the foam layer and the grooves to ensure ventilation and thus enables, e.g., temperature and humidity conditioning of the seat pad is known.

However, because voids are formed in the seat pad by the ventilation portions each formed in a tunnel-like shape, sitting on a seat using such seat pad including ventilation portions results in collapse of the vicinity of the ventilation portions and occlusion of the ventilation portions and thus results in depression of a part of a seat surface of a cushion portion of the seat and/or a front surface of a back portion of the seat. Therefore, failure to provide good sitting comfortability is conceivable.

As a countermeasure for such problem, Patent Literature 1 proposes a seat pad formed by integral expansion molding of an expandable resin material with a ventilation member included therein, the ventilation member having a function that lets air through to/from an outside and including an expanded resin foam subjected to film removal treatment.

In the seat pad according to Patent Literature 1, the ventilation member having a function that lets air through to/from the outside includes an expanded resin foam subjected to film removal treatment, enabling provision of good sitting comfortability with, e.g., temperature and humidity of the seat pad conditioned.

For integral expansion molding of a seat pad using an expandable resin material with such ventilation member included therein, first, a ventilation member is introduced and disposed in a mold and an expandable resin material is injected into the mold with the liquid disposed. Subsequently, the mold is heated to expand the expandable resin material, whereby a seat pad is molded integrally with the ventilation member included.

PRIOR ART LITERATURE

Patent Literature

Patent Literature: Japanese Patent Laid-Open No. 2006-42985

SUMMARY OF INVENTION

Problem to be solved by the Invention

However, upon a liquid expandable resin material being injected into a mold with such ventilation member disposed in the mold, the low-viscosity expandable resin material infiltrates into the ventilation member from a molding surface of the mold, and upon the expandable resin material being expanded in the state in which the low-viscosity expandable resin material has infiltrated in the ventilation member, the expandable resin material infiltrated in the ventilation member may be cured without being not sufficiently expanded.

In this case, the ventilation member with the expandable resin material infiltrated and cured therein has a higher density relative to an expanded resin foam produced as a result of proper expansion of the expandable resin material, and thus, is harder than the expanded resin foam part that has properly been expanded. Therefore, sitting on a seat pad molded in such a manner as above may result in deterioration in sitting comfortability.

The present invention has been made in view of the above problems, and an object of the present invention is to provide a seat pad that can provide good sitting comfortability without causing decrease in bonding between a ventilation member and an expanded resin foam produced by expansion of the expandable resin material.

Means for Solving the Problem

A seat pad according to an aspect of the invention according to claim 1 for solving the above problems is a seat pad including a ventilation member having a function that lets air through to/from an outside, the seat pad being formed by integral expansion molding of an expandable resin material with the ventilation member introduced therein, the seat pad including a covering member that covers at least a part of the ventilation member at an interface between the ventilation member and the expandable resin material, in which the covering member includes an impregnation inhibiting material having a function that inhibits infiltration of the expandable resin material, the function being at least higher than that of the ventilation member.

In this configuration, at least a part of the ventilation member is covered by the covering member at the interface with the expandable resin material, and thus, in the expansion molding process, infiltration of the expandable resin material into the ventilation member is inhibited by the covering member.

Therefore, in a state that infiltration of the low-viscosity expandable resin material into the ventilation member is inhibited, in the expansion molding process, the expandable resin material is properly expanded, ensuring favorable flexibility of the ventilation member. Consequently, good sitting comfortability of the seat pad can be provided.

Furthermore, in the expansion molding process, while infiltration of the expandable resin material into the ventilation member is inhibited, a part of the expandable resin material infiltrates into the ventilation member, and the seat pad is subjected to integral expansion molding in this state, ensuring bonding between the ventilation member and an expanded resin foam produced by the expansion of the expandable resin material.

As a result, good sitting comfortability of the seat pad can be provided with the ensured bonding between the ventilation member and the expanded resin foam.

An aspect of the invention according to claim 2 is the seat pad according to claim 1 in which a part or an entirety of a part, except an end surface exposed to the outside, of the ventilation member is covered by the covering member.

In this configuration, a part or an entirety of the part, except the end surface exposed to the outside, of the ventilation member is covered by the covering member, and thus, an amount of the expandable resin material infiltrated into the ventilation member can arbitrarily be adjusted in response to a demand. Therefore, infiltration of the expandable resin material into the ventilation member can be inhibited while the bonding between the ventilation member and the expanded resin foam is ensured.

An aspect of the invention according to claim 3 provides the seat pad according to claim 1 or 2 in which the covering member includes a fabric material. In this configuration, the covering member includes a fabric material, ensuring flexibility of the ventilation member covered by the covering member. Therefore, good sitting comfortability of the seat pad can be provided.

An aspect of the invention according to claim 4 provides the seat pad according to claim 3 in which the fabric material includes a woven fabric, an aspect of the invention according to claim 5 provides the seat pad according to claim 4 in which the woven fabric is a lock knit knitted using two reeds, and an aspect of the invention according to claim 6 provides the seat pad according to claim 3 in which the fabric material includes a non-woven fabric.

In these configurations, the covering member includes a woven fabric, in particular, a lock knit, or a non-woven fabric, which is a versatile fabric material, making it easy to allow a slight amount of the expandable resin material into the ventilation member while inhibiting infiltration of the expandable resin material into the ventilation member.

An aspect of the invention according to claim 7 provides the seat pad according to any one of claims 1 to 6 in which: the covering member is formed in a sheet shape; and a plurality of opening portions are formed over an entire surface of the sheet shape. This configuration enables use of a simple configuration in which opening portions are formed over the entire surface of the covering member having a sheet shape to cover a part, except the end surface, of the ventilation member.

Effects of Invention

According to the present invention, as a result of a ventilation member being covered by a covering member, in a state that infiltration of a low-viscosity expandable resin material into a ventilation member is inhibited, in an expansion molding process, the expandable resin material is properly expanded, ensuring favorable flexibility of the ventilation member including a fiber member.

Furthermore, in the expansion molding process, while infiltration of the expandable resin material into the ventilation member is inhibited, a part of the expandable resin material infiltrates into the ventilation member, the seat pad is subjected into integral expansion molding in this state, ensuring bonding between the ventilation member and an expanded resin foam produced by the expansion of the expandable resin material.

As a result, infiltration of the expandable resin material into the ventilation member can be adjusted by the covering member without causing decrease in bonding between the ventilation member and the expanded resin foam, ensuring proper flexibility of the ventilation member and thus enabling provision of good sitting comfortability of the seat pad.

MODE FOR CARRYING OUT THE INVENTION

Next, an embodiment of the present invention will be described with reference to FIGS. 1, 2, 3, 4, 5, 6A, 6B, and 6C. The present embodiment will be described taking a case where a seat pad is used for a vehicle seat as an example.

Figure 1:
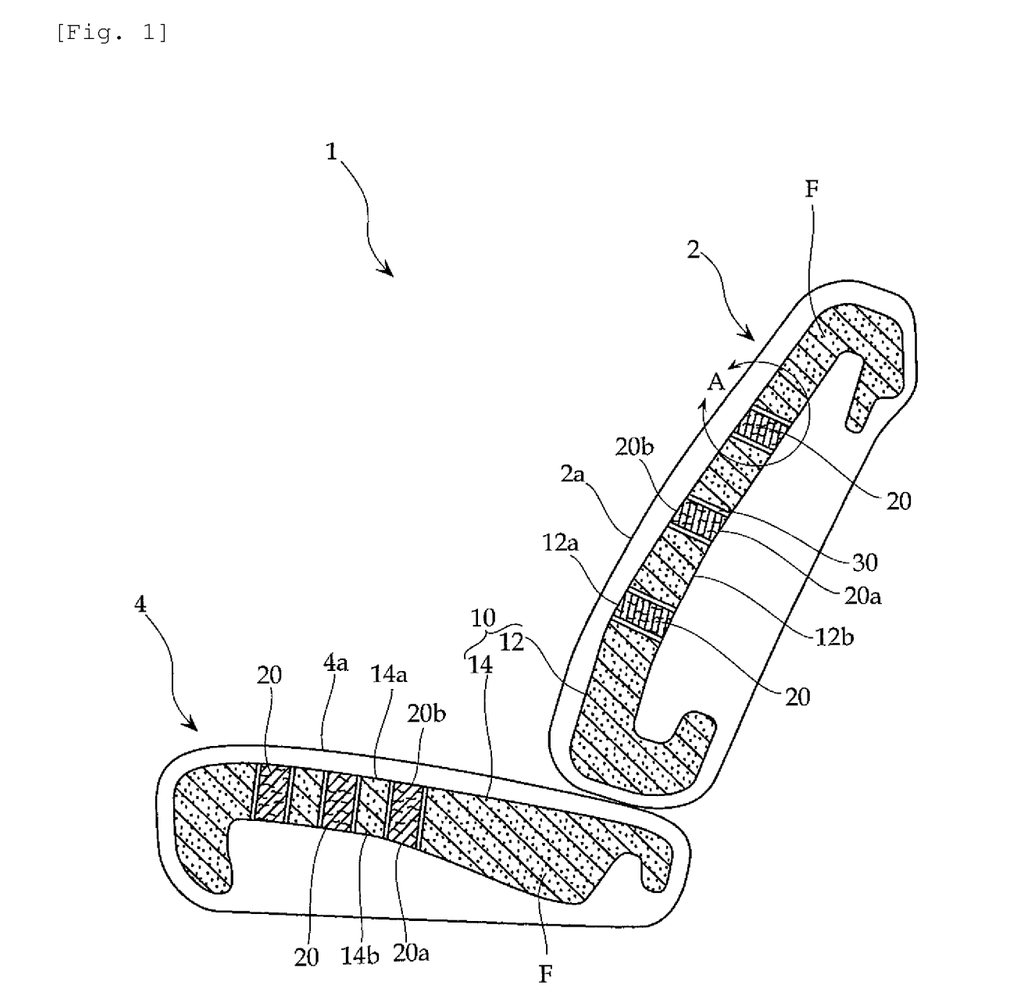
FIG. 1 is a diagram illustrating an overview of a seat pad according to an embodiment of the present invention, which is used for a seat.

FIG. 1 is a diagram illustrating an overview of a seat pad according to the present embodiment, which is used for a seat. As illustrated in the figure, a seat 1 includes a seat back portion 2 that supports the back of an occupant and a seat cushion portion 4 that supports the buttock of the occupant.

A seat pad 10 according to the present embodiment is one to be used for such seat 1, and includes an expanded resin foam F produced by expansion of an expandable resin material, as a main component.

The seat pad 10 includes a back pad 12 that forms the seat back portion 2 as a result of the back pad 12 being covered by a surface skin 2a providing favorable ventilation such as a woven or knitted fabric, and a cushion pad 14 that forms the seat cushion portion 4 as a result of the cushion pad 14 being covered by a surface skin 4a providing favorable ventilation such as a woven or knitted fabric.

In the present embodiment, the seat pad 10 includes ventilation members 20 providing favorable ventilation. A circumference of each ventilation member 20 is covered by a covering member 30 including a sheet-like impregnation inhibiting material having a function that inhibits infiltration of the expandable resin material, the function being higher than that of the ventilation member 20, at an interface with an expanded resin foam F produced by expansion of the expandable resin material.

In the present embodiment, in an expansion molding process of expanding the expandable resin material to mold a seat pad 10, ventilation members 20 covered by covering members 30 are introduced. Since a circumference of each of the introduced ventilation members 20 is covered by the relevant covering member 30, infiltration of low-viscosity liquid expandable resin material into the ventilation members 20 before expansion is inhibited.

As a result of expansion of the expandable resin material with infiltration of the expandable resin material into the ventilation members 20 inhibited by the covering members 30, a seat pad 10 with the ventilation members 20 included is molded in an integrated manner.

Here, the covering members 30 are embedded in the seat pad 10 as they are, together with the ventilation members 20, in a state in which the covering members 30 cover the respective circumferences of the ventilation members 20.

In the seat pad 10, an end surface of each ventilation member 20, which includes a fiber member, is exposed to the outside of the seat pad 10, whereby the front surface 12a side and the back surface 12b side of the back pad 12 communicate with each other via the ventilation members 20 included in the back pad 12, and the seat surface 14a side and the back surface 14b side of the cushion pad 14 communicate with each other via the ventilation members 20 included in the cushion pad 14.

Consequently, ventilation between the seat pad 10 and the outside of the seat pad 10 is ensured, and heat and/or moisture absorbed by the seat pad 10 is discharged via the ventilation members 20 and temperature and humidity of the seat pad 10 are thereby conditioned.

Next, a specific configuration of the ventilation members 20 and the covering members 30 according to the present embodiment will be described.

Figure 2:
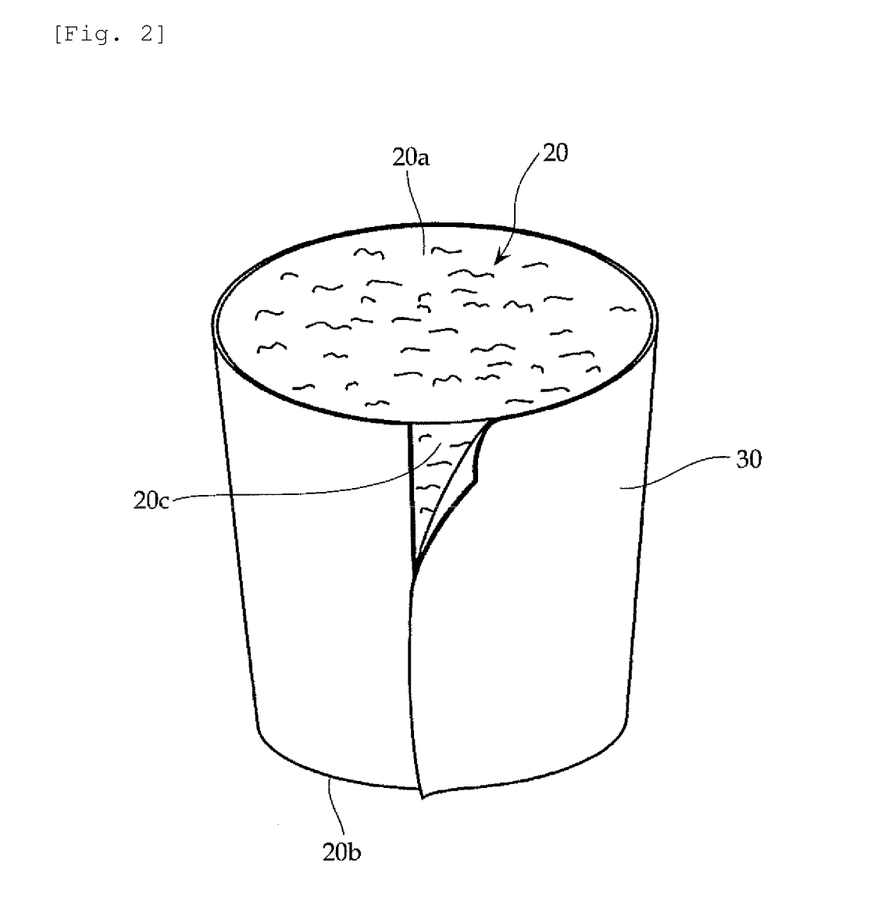
FIG. 2 is a diagram illustrating an overview of a ventilation member and a covering member according to the present embodiment.

FIG. 2 is a diagram illustrating an overview of a ventilation member 20 and a covering member 30 according to the present embodiment. As illustrated in the figure, the ventilation member 20 has a substantially-columnar shape and includes an upper surface 20a and a lower surface 20b, which are end surfaces, and a circumferential surface 20c that is continuous with the upper surface 20a and the lower surface 20b.

In the present embodiment, in integral expansion molding of an expandable resin material with the ventilation members 20 included therein into a seat pad 10, the ventilation member 20 includes fiber from the viewpoint of enhancement in bonding between the ventilation member 20 and an expanded resin foam F included in the seat pad 10 and also from the viewpoint of further enhancement in ventilation of the ventilation member 20.

The covering member 30 includes a sheet-like impregnation inhibiting material having a function that inhibits infiltration of the expandable resin material, the function being higher than that of the ventilation member 20. In the present embodiment, for the covering member 30, a woven fabric or a non-woven fabric, which is a fabric material, is used, and thus, while infiltration of the expandable resin material into the ventilation member 20 is inhibited, infiltration of a slight amount of the expandable resin material into the ventilation member 20 is allowed.

Where a woven fabric is used as the covering member 30, what is called lock knit (also referred to as "half tricot") knitted using two reeds is preferable, and as a material of the woven fabric, nylon (registered trademark) is preferable.

A size of each of yarns used for the two reeds is 30 denier or 15 denier respectively, or a combination of a 30 denier yarn and a 20 denier yarn is preferably used; however, a woven fabric using 30 denier yarns respectively is most preferable.

1 denier is a unit representing a size of a yarn that weigh 1 g per 9000 m.

On the other hand, where a non-woven fabric is used as the covering member 30, a volume of ventilation of the non-woven fabric is preferably within a range of 15 to 50 $cm^3/cm^2 \cdot sec$.

Next, a method for manufacturing a seat pad 10 according to the present embodiment will be described.

Figure 3:
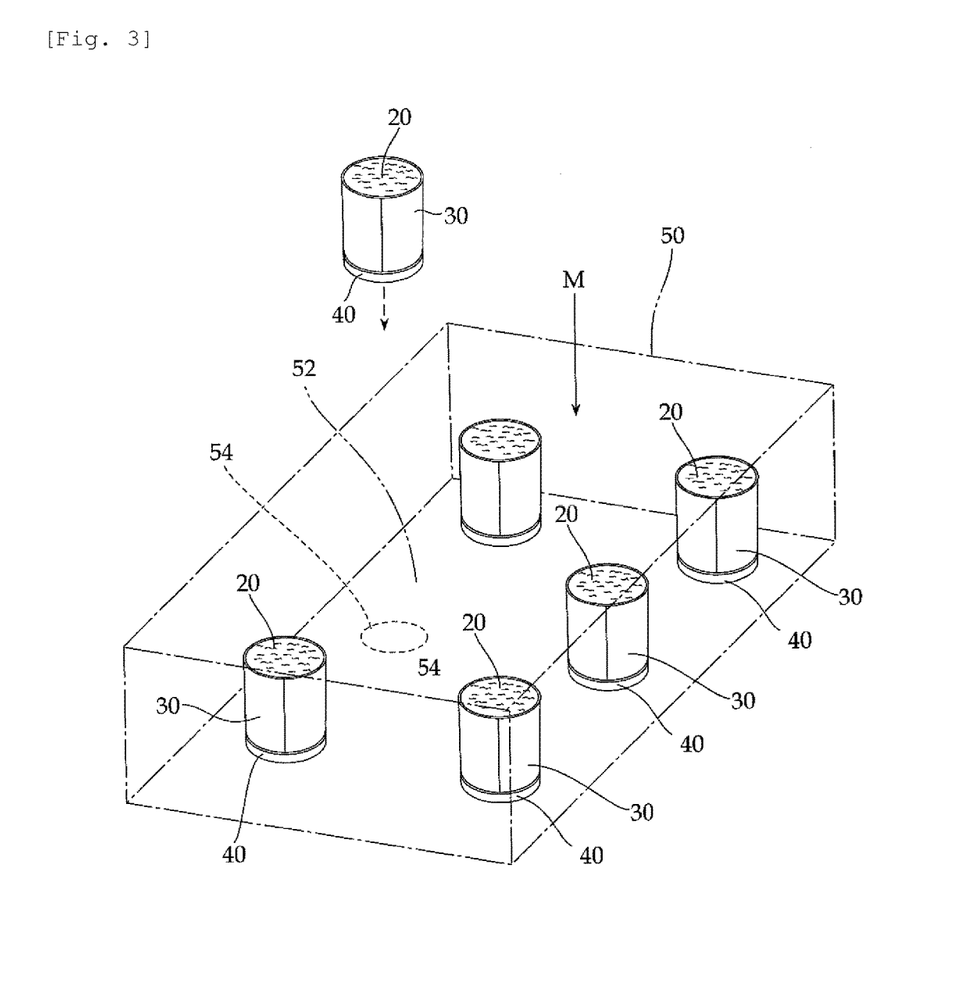
FIG. 3 is a diagram illustrating an overview of a method for manufacturing a seat pad according to the present embodiment.

FIG. 3 is a diagram illustrating an overview of a method for manufacturing a seat pad 10 according to the present embodiment.

As illustrated in the figure, in the present embodiment, first, a sealing member 40 of a sheet metal having a frame shape or a rough ring shape in planar view is attached to a part of a circumferential surface 20c around a lower surface 20b of each ventilation member 20, the circumferential surface 20c being covered by a covering member 30.

The lower surface 20b of each ventilation member 20 with the sealing member 40 attached thereto is disposed on a molding surface 52 of a lower mold 50 of an imaginary mold, which is indicated by alternate long and two short dashes lines. On the molding surface 52, positioning marks 54 are provided at respective positions on the molding surface 52 at which the ventilation members 20 are disposed, the positions corresponding to respective positions in the seat pad 10 at which the ventilation members 20 are provided.

In the present embodiment, six ventilation members 20 are disposed and positioned on the molding surface 52 in alignment with the respective marks 54, and in this state, an upper mold and core molds, which are not illustrated, are moved in a mold clamping direction relative to the lower mold 50 to clamp the mold.

In the present embodiment, upon mold clamping being performed as result of moving the upper mold and the core molds in the mold clamping direction, a molding surface of each core mold is brought into abutment with an upper surface 20a of the corresponding ventilation member 20. In other words, the molding surfaces of the core molds and the molding surface 52 of the lower mold 50 become continuous with each other via the respective ventilation members 20.

After the mold clamping, a liquid expandable resin material M is injected toward the molding surface 52 to supply the expandable resin material M into the mold. In the present embodiment, an inlet for the expandable resin material M is set in a position at which the expandable resin material M is prevented from falling directly toward the ventilation members 20 disposed in the lower mold 50, that is, the expandable resin material M is prevented from being in direct contact with the ventilation members 20.

The low-viscosity liquid expandable resin material M suppled in the mold flows on the molding surface 52 along a gradient of the molding surface 52 of the lower mold 50. When the expandable resin material M flows around the circumferences of the ventilation members 20 disposed on the molding surface 52, infiltration of the low-viscosity liquid expandable resin material M into the ventilation members 20 from minute gaps between the molding surface 52 and the lower surfaces 20b of the ventilation members 20 is inhibited by the sealing members 40 attached to the parts of the respective circumferential surfaces 20c around the lower surfaces 20b of the ventilation portions 20.

After the expandable resin material M being injected toward the molding surface 52, the mold is heated to expand the expandable resin material M supplied in the mold. In the present embodiment, along with the expansion, a slight amount of the expandable resin material M infiltrates into the ventilation members 20 via the respective covering members 30, and the infiltrated expandable resin material M is cured.

Upon the expansion of the expandable resin material M being ended in this state, an expanded resin foam F is produced, whereby a back pad 12 or a cushion pad 14 of a seat pad 10 with the ventilation members 20 included therein is molded in an integrated manner.

After the seat pad 10 being molded, the upper mold and the core molds are moved in a mold opening direction to open the mold, the molded seat pad 10 is removed from the lower mold 50, and the sealing members 40 are removed from the molded seat pad 10.

In the present embodiment, upon removal of the seat pad 10 from the lower mold 50, the sealing members 40 remain in a state in which the sealing members 40 adhere to the lower mold 50 as a result of the heating of the mold, and the sealing members 40 thus fall off from the seat pad 10.

Figure 4:
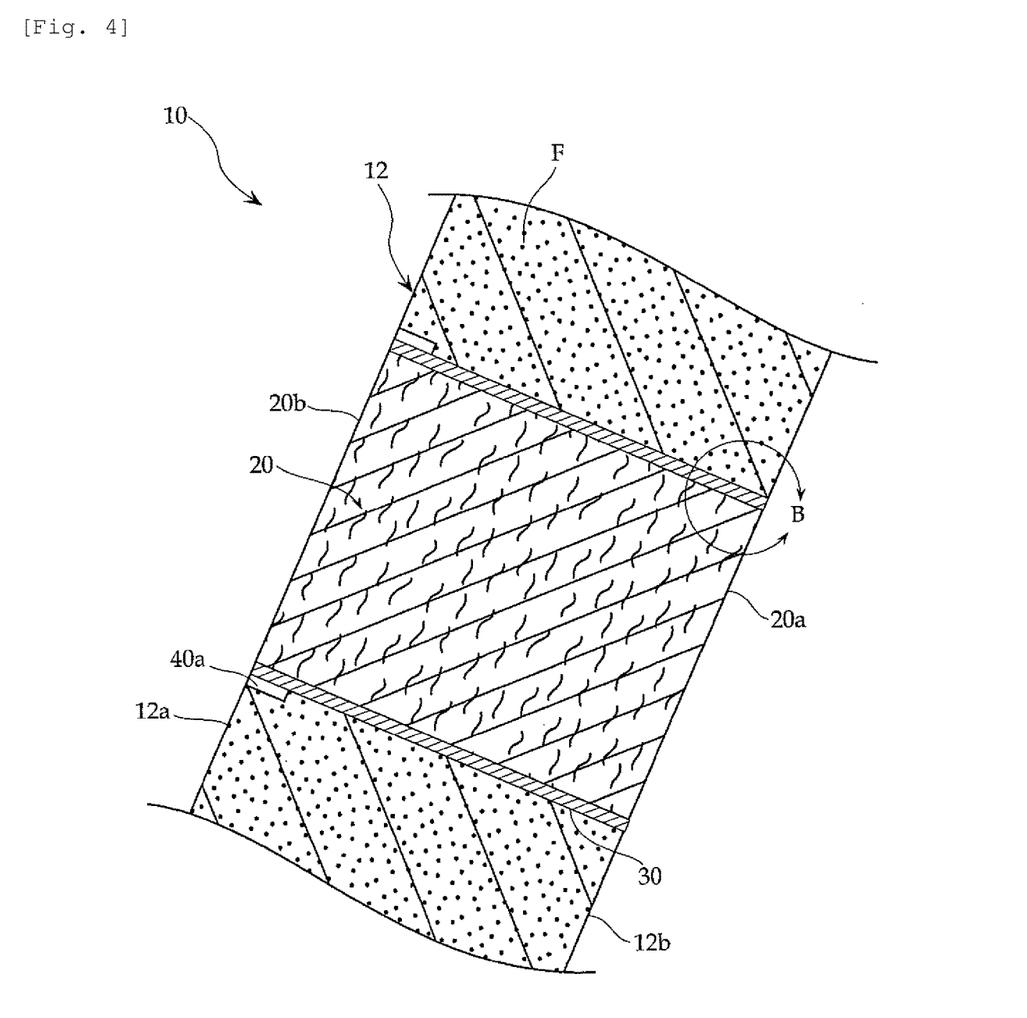
FIG. 4 is an enlarged view of Part A in FIG. 1.
Figure 5:
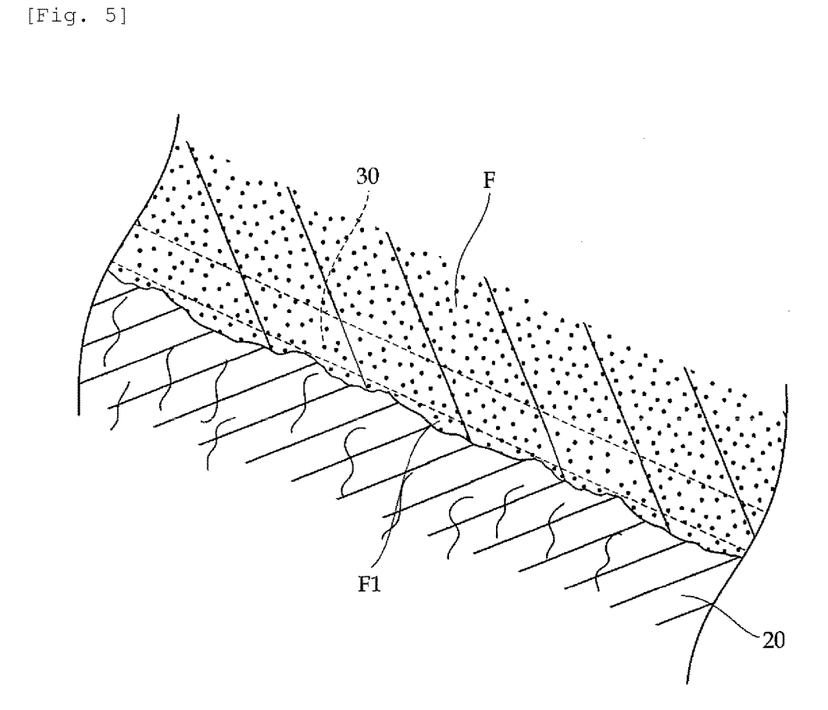
FIG. 5 is an enlarged view of Part B in FIG. 4.

FIG. 4 is an enlarged view of part A in FIG. 1 illustrating an overview of the expansion-molded seat pad 10, and FIG. 5 is an enlarged view of part B in FIG. 4. As illustrated in FIGS. 4 and 5, the back pad 12 is formed by integral molding of ventilation members 20 covered by respective covering members 30 and an expanded resin foam F in a state in which the ventilation members 20 are bonded to the expanded resin foam F via the covering members 30.

More specifically, since a cured portion F1 resulting from curing of a slight amount of the expandable resin material infiltrated into a part of each ventilation member 20 via the relevant covering member 30 is formed, bonding between the ventilation member 20 with the covering member 30 wrapped therearound and the expanded resin foam F is ensured by the cured portion F1.

Between the part of the circumferential surface 20c of each ventilation member 20, from which the sealing members 40 have been removed, around the lower surface 20b, and the expanded resin foam F, a ring-like groove portion 40a following the sealing member 40 is formed.

As described above, in the back pad 12 resulting from integral molding of the ventilation members 20 and the expanded resin foam F, the lower surface 20b of each ventilation member 20 disposed on the molding surface 52 is exposed to the outside of the back pad 12 on the front surface 12a side of the back pad 12, the upper surface 20a of each ventilation member 20, which is in abutment with a core mold, is exposed to the outside of the back pad 12 on the back surface 12b side of the back pad 12.

Consequently, the front surface 12a side and the back surface 12b side of the back pad 12 communicate with each other via the ventilation members 20, ensuring ventilation of the back pad 12.

On the other hand, in the case of the cushion pad 14 resulting from integral molding of ventilation members 20 and an expanded resin foam F, a lower surface 20b of each ventilation member 20 disposed on a molding surface 52 is exposed to the outside of the cushion pad 14 on the front surface 14a side of the cushion pad 14 and an upper surface 20a of each ventilation member 20, which is in abutment with a core mold, is exposed to the outside of the cushion pad 14 on the back surface 12b side of the cushion pad 14.

Consequently, the front surface 14a side and the back surface 14b side of the cushion pad 14 communicate with each other via the ventilation members 20, ensuring ventilation of the cushion pad 14.

The seat pad 10 having the above configuration is molded by covering ventilation members 20, which each include a fiber member, with respective covering members 30, and expanding an expandable resin material M with the ventilation members 20 in this state disposed on a molding surface 52 of a lower mold 50 of a mold.

Therefore, when the expandable resin material M is injected into the mold or the expandable resin material M is expanded, infiltration of the expandable resin material M into the ventilation members 20 is inhibited by the covering members 30.

As described above, inhibition of infiltration of the expandable resin material M into the ventilation members 20 ensures flexibility of the ventilation members 20 each including a fiber member, resulting in enhancement in sitting comfortability of the seat pad 10 obtained by integral molding of the ventilation members 20 and the expanded resin foam F with the ventilation members 20 included.

Furthermore, in the present embodiment, the covering members 30 including a woven fabric (in particular, a lock knit) or a non-woven fabric inhibit infiltration of the expandable resin material M into the ventilation members 20 while allowing infiltration of a slight amount of the expandable resin material M, and thus, the slight amount of the expandable resin material M infiltrated in the ventilation members 20 is cured and thereby form cured portions F1, and bonding between the ventilation members 20 and the expanded resin foam F is ensured by the cured portions F1.

Therefore, good sitting comfortability of the seat pad 10 can be provided with the bonding between the ventilation members 20 and the expanded resin foam F ensured by the cured portions F1.

In the present embodiment, as described above, the covering members 30 each include a versatile woven fabric (in particular, lock knit) or non-woven fabric, making it easy to allow infiltration of a slight amount of the expandable resin material M into the ventilation members 20 while inhibiting infiltration of the expandable resin material M into the ventilation members 20.

On the other hand, in the present embodiment, infiltration of the liquid expandable resin material M flowing on the molding surface 52 into the ventilation members 20 from minute gaps between the molding surface 52 and the lower surfaces 20b of the ventilation members 20 is inhibited by the sealing members 40 attached to the respective parts of the circumferential surface 20c around the lower surfaces 20b of the ventilation members 20.

Therefore, infiltration of the expandable resin material M into the ventilation members 20 from minute gaps between the molding surface 52 and the lower surfaces 20b of the ventilation member 20, from which the expandable resin material M easily infiltrates, can efficiently be inhibited.

In addition, a sealing member 40 is attached to the circumferential surface 20c of each ventilation member 20 with a covering member 30 wrapped therearound, whereby a state in which the covering member 30 is wrapped around the ventilation member 20 can favorably be maintained.

Here, the cured portions F1 formed as a result of infiltration into the ventilation members 20 via the covering members 30 and the groove portions 40a each formed in a ring-like shape following the relevant sealing member 40 as a result of removal of the sealing member 40 are each formed only in a region that is quite small relative to a size of the back pad 12 or the cushion pad 14 of the seat pad 10.

Therefore, the presence of such cured portions F1 and the groove portions 40a provide no substantial effects on good sitting comfortability of the seat pad 10 according to the present embodiment.

Here, the present invention is not limited to the above embodiment, and various alterations are possible without departing from the spirit of the invention. Although the above embodiment has been described in terms of the case where bonding between the ventilation members 20 and the expanded resin foam F is ensured by the cured portions F1 formed as a result of curing of a slight amount of the expandable resin material infiltrated into the ventilation members 20 via the covering members 30, for example, as a material included in the covering members 30, an impregnation inhibiting material having an adhesion property may be used or the covering members 30 may be bonded to the ventilation members 20 using, e.g., an adhesion tape.

Figure 6A:
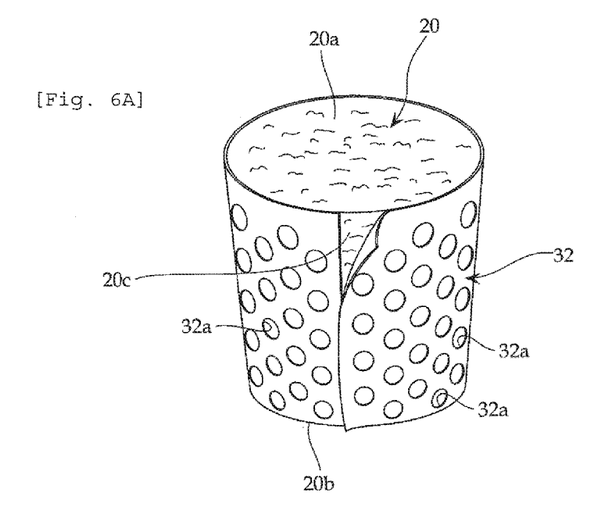
FIGS. 6A, 6B and 6C include diagrams each illustrating an overview of another embodiment of a covering member.

On the other hand, instead of the covering members 30 described in the above embodiment, as illustrated in FIG. 6A, covering members 32 of a woven fabric (in particular, a lock knit) or a non-woven fabric, each including a plurality of ventilation holes 32a, which are opening portions, formed over a substantially entire surface of the sheet shape, may be used.

The covering member 32 enables provision of good sitting comfortability of the seat pad 10 with more favorable bonding between the ventilation members 20 and the expanded resin foam F ensured.

Figure 6B:
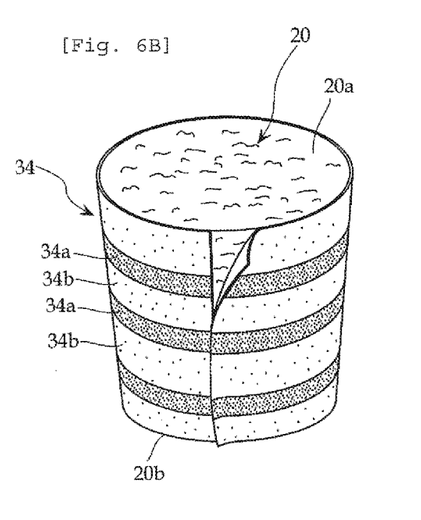

Also, as illustrated in FIG. 6B, instead of the covering members 30, covering members 34 of a woven fabric (in particular, a lock knit) or a non-woven fabric, each including a plurality of horizontally-extending ventilation zones 34a, may be used. As a result of the covering members 34 being wrapped around the respective circumferential surfaces 20c of the ventilation members 20, the circumferential surfaces 20c of the ventilation members 20 are partially covered.

Each covering member 34 is formed in a plurality of horizontal stripes in which the ventilation zones 34a and a non-ventilation portions 34b are alternately provided from an upper surface 20a to a lower surface 20b of a columnar ventilation member 20 when the covering member 34 is wrapped around the ventilation member 20, and the ventilation zones 34a are coarse compared to the non-ventilation portions 34b.

Figure 6C:
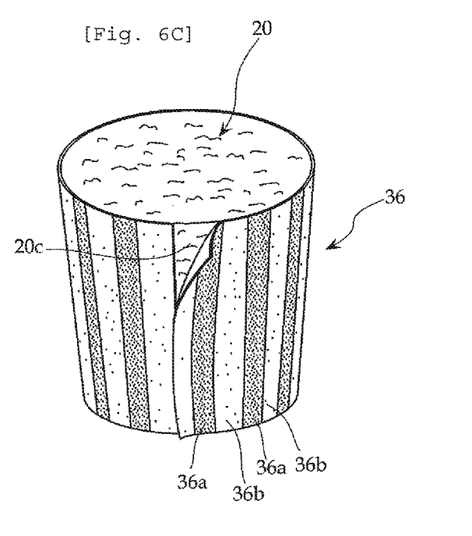

Furthermore, as illustrated in FIG. 6C, instead of the covering members 30, covering members 36 of a woven fabric (in particular, a lock knit) or a non-woven fabric, each including a plurality of vertically-extending ventilation zones 36a, may be used. As a result of the covering members 36 being wrapped around the respective circumferential surfaces 20c of the ventilation members 20, the circumferential surfaces 20c of the ventilation members 20 are partially covered.

Each covering member 36 is formed in a plurality of vertical stripes in which the ventilation zones 36a and non-ventilation portions 36b are alternately provided over a circumferential surface 20c of a columnar ventilation member 20 when the covering member 36 is wrapped around the ventilation member 20, and the ventilation zones 36a are coarse compared to the non-ventilation portions 36b.

Use of these covering members 32, 34 and 36 to partially cover the circumferential surfaces 20c of the ventilation members 20 enables a state of the bonding between the ventilation member 20 and the expanded resin foam F to be arbitrarily adjusted in response to a demand.

Although the above embodiment has been described in terms of the case where the ventilation members 20 are formed in a substantially-columnar shape, for a shape of the ventilation members 20, an arbitrary shape can be employed as long as the shape includes end surfaces exposed to the outside in a front surface 12a and a back surface 12b of a back pad 12 of a seat pad 10 or includes end surfaces exposed to the outside in a seat surface 14a and a back surface 14b of a cushion pad 14 of a seat pad 10.

Here, the end surface on the front surface 12a side and the end surface on the back surface 12b side of the back pad 12 or the end surface on the seat surface 14a side and the end surface on the back surface 14b side of the cushion pad 14 may be identical to or different from each other in shape and/or dimensions.

Therefore, for example, instead of the columnar ventilation members 20, ventilation members each formed in a block shape so as to be in contact with a region from the buttock to the thighs of an occupant can be used in a cushion pad 14 of a seat pad 10.

Likewise, ventilation members each formed in a block shape so as to be in contact with an arbitrary region, e.g., from the waist to the shoulder blades of an occupant can be used in a back pad 12 of a seat pad 10.

Although the above embodiment has been described in terms of the case where the seat 1 in which the seat pad 10 is used is a vehicle seat, the seat 1 can also be used for, for example, any of various types of seats for, e.g., train cars, aircrafts or ships and can also be used for, e.g., any of chairs, cushions and sofas to be used in general households or various facilities.

REFERENCE SIGNS LIST 1 seat
10 seat pad
12 back pad
14 cushion pad
20 ventilation member
20a upper surface (end surface)
20b lower surface (end surface)
20c circumferential surface
30, 32, 34, 36 covering member
32a ventilation hole (opening portion)
40 sealing member
50 lower mold
52 molding surface
F expanded resin foam
F1 cured portion
M expandable resin material

The invention claimed is:

1. A seat pad including a ventilation member having a function that lets air through to/from an outside, the seat pad being formed by integral expansion molding of an expandable resin material with the ventilation member introduced therein, the seat pad comprising
a covering member that covers at least a part of the ventilation member on the outside of the ventilation member and being present only at an interface between the ventilation member and the expandable resin material, wherein
the covering member includes an impregnation inhibiting material having a function that inhibits infiltration of the expandable resin material, the function being at least higher than that of the ventilation member.

2. The seat pad according to claim 1, wherein at least a part, except an end surface exposed to the outside, of the ventilation member is covered by the covering member.

3. The seat pad according to claim 1, wherein the covering member includes a fabric material.

4. The seat pad according to claim 3, wherein the fabric material includes a woven fabric.

5. The seat pad according to claim 4, wherein the woven fabric is a lock knit knitted using two reeds.

6. The seat pad according to claim 3, wherein the fabric material includes a non-woven fabric.

7. The seat pad according to claim 1, wherein:
the covering member is formed in a sheet shape; and a plurality of opening portions are formed over an entire surface of the sheet shape.

8. The seat pad according to claim 1, wherein the ventilation member is composed of fibers.

* * * * *